…

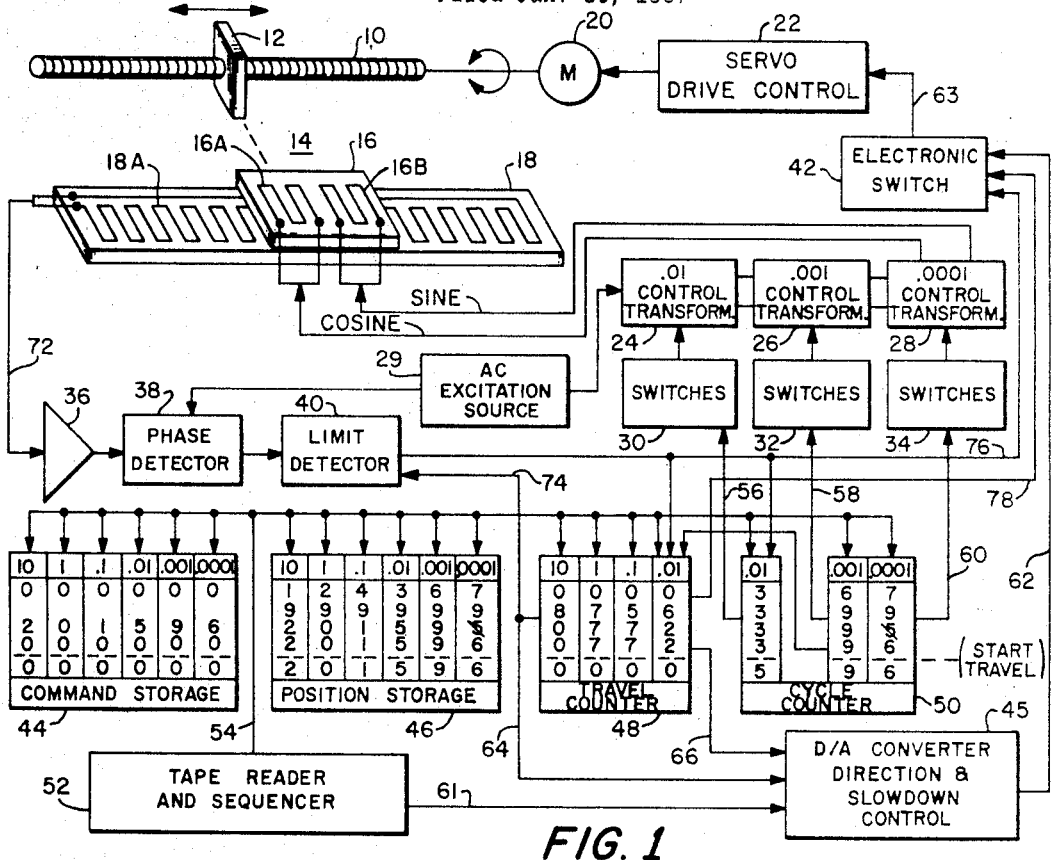
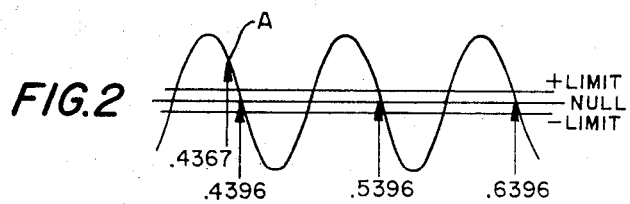
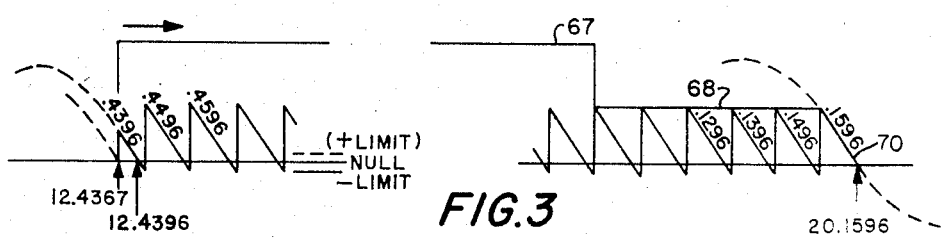
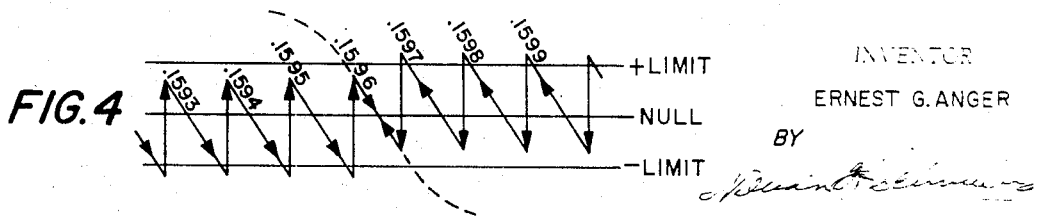

United States Patent Office 3,473,100
Patented Oct. 14, 1969

3,473,100
FINE AND COARSE SERVOMOTOR POSITIONING CONTROL SYSTEM
Ernest G. Anger, Wauwatosa, Wis., assignor to Square D Company, Park Ridge, Ill., a corporation of Michigan
Filed Jan. 30, 1967, Ser. No. 612,658
Int. Cl. H02p 1/54, 5/46, 7/74
U.S. Cl. 318—18                                            10 Claims

ABSTRACT OF THE DISCLOSURE

The positioning control system herein described uses a feedback transducer that provides a cyclic analog signal as two members of the transducer are moved relative to each other and a null signal when the members are in a selected position relative to each other and one of the members is energized with alternating currents proportional to the sine and cosine of a given angle so that for each particular set of currents applied to the transducer a null signal at a particular point is established. The transducer is made to function as a linear movement quantizer by successively switching the applied voltages to the transducer to create a null point in the direction toward which the transducer must move to reach a selected final position and creating a new null point a predetermined distance in the same direction of travel as the previously created null point upon detection of the previously detected null point by the transducer.

---

The present invention relates to positioning control systems and more particularly, to a system wherein a digital control apparatus controls the operation of a transducer having a cyclic analog output signal for accurately controlling the relative positions of a pair of relatively movable members.

The positioning control system according to my invention employs a transducer having a pair of relatively movable members that provide an output voltage wave whose magnitude varies in a sine-like relation when the members are moved relative to each other a distance less than the total length of travel of the members. Thus as the two members are moved relative to each other, the transducer will provide a series of identical sine-like voltage waves, each of which has at least one predetermined point where the polarity of the voltage signal changes. While not limited thereto, the system according to my invention is well suited for use with the transducer of the type disclosed in a United States patent granted to Robert W. Tripp, No. 2,849,668, on Aug. 26, 1958. In the Tripp patent, a transducer is disclosed having a fixed scale whereon a precisely located winding is formed as a series of conductive loops and a movable scale called a slider having a pair of accurately located windings. The loops on the slider are approximately equal in size to the loops on the fixed scale and are displaced 90° from each other relative to the loops of the fixed scale.

When the loops on the slider are energized with relatively high frequency alternating currents, a voltage will be induced in the winding on the fixed scale; and, as the slider is moved a predetermined distance along the fixed scale, the amplitude of the modulated alternating induced voltage will vary in a sinusoidal relation with the distance moved. The loops on the fixed scale and slider extend a precise distance on the fixed scale, i.e., 1/10 inch. Thus as the slider is moved along the fixed scale, a continuous sine shaped signal wave will be provided by the fixed scale with a null signal occurring each time the wave passes through zero.

One inherent limitation in the system disclosed in the Tripp patent is that while the transducer may be used to accurately position within each 1/10 inch segment, it is incapable of designating the location of any particular segment. To overcome this deficiency, positioning systems according to the Tripp patent are usually provided with resolvers, usually two, wherein one resolver, known as the coarse resolver, has a range of operation corresponding to the entire length of travel of the slider and the medium resolver has a range equal to a portion of the travel of the slider. During positioning, by use of suitable sensing and switching means, control is transferred from the coarse resolver when remaining desired travel is within the range of measurement of the medium resolver, and finally to the transducer when remaining distance is within a selected 1/10 inch transducer measurement cycle.

In the Tripp patent, a system is disclosed for dividing the 1/10 inch segment, as represented by one full cycle on the sine wave, into smaller increments. This is accomplished by selectively varying the current inputs to the two windings of the slider to displace the sine wave output of the fixed scale in discrete steps. As the two windings of the slider are disposed in a space quadrature relation with each other, for a given position relative to the windings of the windings on the fixed scale one slider winding will induce a sine value input in the fixed scale windings while the other is inducing a cosine value signal. The winding on the fixed scale algebraically adds the sine and cosine input signals and as the current inputs to the two windings are selectively unbalanced, the position of the null signal from the fixed scale can be changed. When currents having values proportional to angles which are multiples of 36° are supplied to the two windings, the 1/10 increments on the scale can be divided by 10 and the transducer will now be able to position to .01 inch. Additionally, if the sine and cosine values are varied in additional steps proportional to angles corresponding to 3.6° and a .36°, the transducer will be able to position to .001 inch and .0001 inch respectively.

The system according to the present invention may utilize the ratioing of the currents in the slider and accomplishes positioning of the slider relative to the fixed scale without the use of the coarse and medium resolvers. The system may operate in either of two ways; either entirely digitally to the preselected .0001 inch position, or, as hereinafter described, digitally controlling the movement of the slider to the preselected 1/100 inch position and then by use of the analog sine wave signal controlling the slider movement to the preselected .0001 inch portion of the selected 1/10 inch position.

It is an object of the present invention to control the relative positions of two relatively movable members with a system that includes a transducer capable of generating an analog output voltage signal having a magnitude that varies cyclicaly and provides a complete cycle of a sine-like voltage wave as the members are moved relative to each other a unit distance between two predetermined spaced points with the range of total relative movement of the members being a multiple of the unit distance so that the transducer provides a series of repeated full wave cycles as the members are moved relative to each other over their full range of movement, means for detecting a predetermined point on the sine-like wave of each half cycle and supplying an output signal as the members are moved relative to each other, switch means supplying inputs to the transducer for incrementally shifting the position of the voltage wave relative to the members and thereby the positions of the detected points for dividing each unit distance into a predetermined number of equal length segments, an energizable drive means for causing the relative movement between the members, and a means including a counter capable of being switched to indicate the total number of segments of travel required to move the members relative to each other between two selected positions and arranged to sequence the switch means for shifting the wave and thereby the position of the points one segment in the direction of required movement for each detected point on the voltage wave.

A further object is to control the relative positions of a pair of relatively movable machine parts with a position control system that includes a transducer, means for detecting an output signal from the transducer, means including a switch for selectively sequencing the operation of the transducer, means for moving the machine parts relative to each other, and means including a counter having an input responsive to an output of the detecting means and an output arranged to sequence the switch means in accordance with a digital count stored in the counter, and preferably to use a transducer in the system which has a pair of independently movable elements with one element known as a scale mounted on one of the machine parts and having a continuous winding formed thereon as a series of identical loops and the other element known as a slider mounted on the other machine part and having a pair of separate windings thereon each inductively coupled with the winding on the scale for inducing a voltage signal in the scale winding, with said voltage signal providing a sine-like voltage wave having an amplitude which varies cyclically when the machine parts are moved a predetermined unit distance relative to each other between two selected points and providing a positioning signal in a region intermediate the spaced points whereat the polarity of the voltage wave reverses, and with the means for sequencing the operation of the transducer including means for energizing the windings of the slider selectively with input signals proportional to the sine and cosine values respectively of the sums of the angles corresponding to selected points on one cycle of the voltage wave for electrically displacing the relative positions of the voltage wave and the scale and thereby the location of the region of the positioning signal relative to the scale to divide the unit distance into equal length segments so that each time a posiioning signal is detected by the detector means the counter will be switched and supply suitable signals to the switch means to displace the position of the voltage wave one segment toward a selected final position and to energize the drive means for moving the machine parts toward the final position until a signal from the counter and the detector means to the drive means indicates that the machine parts are at the final position.

Further objects and features of the invention will be readily apparent to those skilled in the art from the specification and appended drawing illustrating certain preferred embodiments in which:

FIG. 1 illustrates in diagrammatical form an example of a circuit arrangement according to an embodiment of the present invention.

FIG. 2 illustrates a curve showing the magnitudes of the output signal voltages from the positioning transducer when the system shown in FIG. 1 is initially programmed for movement of the machine parts to a newly selected position.

FIG. 3 illustrates the manner in which the voltage wave in FIG. 3 is shifted as the parts to be positioned approach a selected position and a typical input signal to a drive motor in FIG. 1.

FIG. 4 illustrates the manner in which the voltage wave in FIG. 2 is shifted in another embodiment of my invention wherein the system operates digitally to the final position.

Referring to FIG. 1, it is assumed that the positioning system according to the present invention will position one part relative to another part, i.e., control the positions of a worktable of a machine tool, not shown. A lead screw for the worktable is indicated as 10 in the drawing. Rotation of the screw 10 causes a nut 12 to move along the screw 10 and produce the required movement of the worktable. A transducer 14 is provided with a slider 16 and a scale 18 with the scale 18 mounted on a support for the worktable and the slider 16 movable with the nut 12. While the present invention may be used with other types of transducers and with the scale mounted on the worktable and the slider mounted on the support for the worktable, the transducer 14 shown is of the type disclosed in U.S. Patent 2,849,668, granted to Robert W. Tripp on Aug. 26, 1958.

The transducer as disclosed in the Tripp patent comprises a scale and a slider movable with respect to each other, with the scale and slider fastened to the machine elements whose relative positions or motions are to be controlled. The scale bears a continuous winding in the form of a multiplicity of conductors disposed in a plane parallel to the direction of relative motion of the slider, the conductors extending transversely of that direction. The conductors are connected into a single series circuit with adjacent portions carrying current in opposite directions transversely of the length of the array. The slider member bears two windings similar to the winding of the scale but usually shorter and disposed with respect to each other in space quadrature of the cycle defined on the continuous winding of the scale by the separation, center to center, of three adjacent conductors of scale winding, the separation being taken in the direction of relative motion of the scale and the slider. The scale and the slider are supported for relative motion with their windings at a small and constant separation, and the design of the windings is preferably such that the voltage induced in any of them by a current in a winding of the other member is a substantially sinusoidal function of the relative position of the members.

The control system as shown in FIG. 1 additionally includes a motor 20, a servo-drive control 22, a plurality of control transformers 24, 26, and 28 respectively controlled by switches 30, 32 and 34, an amplifier 36, a phase detector 38, a limit detector 40, an electronic switch 42, a digital to analog converter, direction and slow down control 45 and a plurality of digital counters shown as a command storage 44, a position storage 46, a travel counter 48 and a cycle counter 50, each of which receives an input from a tape reader and sequencer 52.

The construction of the components of the control system indicated above to provide the functions as will be hereinafter described is well known to those skilled in the art and hence are not specifically shown. In the system shown in FIG. 1, the transformers 24, 26 and 28 are energized by a relatively high frequency alternating current excitation source 29 and are provided with suitable taps controlled by the switches 30, 32 and 34 to respectively supply the windings 16A and 16B of the slider 16 with currents proportional to the sine and the cosine values of angles in steps of 36°, 3.6° and 0.36° to divide the 360° cycle of the output signal wave of the winding 18A on the scale 18 into 1000 parts. The windings on the scale 18 and the slider 16 are preferably located so the winding 18A provides a full cycle of a sine wave repeated for each $\frac{1}{10}$ inch segment of the scale 18 and thus the transformers 24, 26 and 28 and their companion switches 30, 32 and 34 provide an arrangement whereby each $\frac{1}{10}$ inch unit distance on the scale is divided into 1000 segments in a manner disclosed in the Tripp patent.

The operation of the system is as follows, reference being had to FIGS. 1–4 of the drawing. Assuming the parts of the machine whereon the scale 18 and the slider 16 are mounted are at a previously selected position of 12.4367 inches as shown in the position storage counter 46, and it is desired to move to a new position of 20.1596 inches requiring a machine travel of 07.7229 inches. In one embodiment of the system a means, not shown, may be used to supply a series of input counting pulses from the tape reader and sequencer 52 via suitable input means, designated by a numeral 54, to the command storage counter 44, wherein the new position will be read, to the position storage 46, wherein the old position is registered, to the travel counter 48, which will record the amount the parts of the machine must move to the new position, and to the cycle counter 50. The count in the cycle counter 50 will program the switches 30, 32 and 34 for switching of the taps on transformers 24, 26 and 28 to change the voltages on the slider windings 16A and 16B during movement of the slider 16 to the newly selected position.

Initially the old position 12.4367 inches will be registered in the position storage 46 and the travel counter 48 will register zero because the slider 16 is in the previously selected position. The cycle counter 50 will register the number 367 when the parts are at the old position.

One method employable to to switch the counters 44, 46, 48 and 50 to reposition the machine parts from the old position to the new position comprehends the use of the nines complement method to subtract the number in the position storage 46 from the number in the command storage 44 and deposit the difference in the travel counter 48 and the last two stages of the cycle counter 50. When the counters are thus switched, the position storage 46 is first counted up to read 999999 and the number of counts required to count the position storage 46 from the count of 12.4367 to 999999 is transferred into the travel counter 48 and into the last two stages of the cycle counter 50. Thus when the position counter 46 is counted to 999999, the travel counter 48 will read 8756 and the cycle counter 50 will read 99 with the count of 3 in the .01 column of the cycle counter 50 remaining unchanged. The tape reader and sequencer 52 then adds the count 201596 of the new position in the command storage 44 to the position storage 46 causing the position storage to have a count of 201595. The count thus transferred is also added to the count previously present in the travel counter 48 and the last two stages of the cycle counter 50 so that the travel counter 48 now reads 0772 because of a count carry from the cycle counter 50 and the cycle counter reads 395 with the count of 3 in the .01 column of the cycle counter 50 remaining unchanged. At the completion of the transfer of the count 201596 from the command storage 44 to the position storage 46, the travel counter 48 and the cycle counter 50, the tape reader and sequencer 52 will reset the command storage 44 so all stages read zero and supply an additional count to the position storage 46 and the cycle counter 50 causing the number 201596 to be recorded in the position storage 46 and the number 396 to be recorded in the cycle counter.

At the conclusion of the transfer of the foregoing information, the count of 396 in the cycle counter 50, as delivered via means shown as the leads 56, 58 and 60, will have conditioned the transformers 24, 26, and 28 and the switches 30, 32 and 34 to cause a signal voltage wave having a null corresponding to .4396 on the scale 18 to be impressed on windings 16A and 16B of the slider 16 as shown in FIGS. 2 and 3. The tape reader and sequencer 52 is then sequenced to supply a signal via means shown as a lead 61 to the converter 45 which is programmed by the travel counter 48 to supply the electronic switch 42 with a signal through a means shown as a lead 62. The counter 48 supplies a suitable signal through a means including a lead 64 to the converter 45 which programs the converter 45 to require the motor 20 rotate in a forward direction. Additionally, the converter 45 receives a sigal via a means including a lead 66 from the travel counter 48 which will require that the motor 20 operate at a maximum speed because of the state of the count stored in the counter 48. The electronic switch 42 in response to the signal from the converter 45 supplies an input to the serodrive control 22 which causes the motor 20 and the lead screw 10 to rotate in a forward direction at a maximum speed and the nut 12 to drive the machine work table and the slider 16 in a direction toward the new position. After the nut 12 has been driven a predetermined distance, as dictated by the state of the count in the travel counter 48, as will be later explained, the signal via lead 66 to the converter 45 causes the speed of the motor 20 to be reduced to a preselected intermediate speed. When the count in the travel counter 48 is additionally changed to a preselected value, the converter 45 causes the speed of the motor 20 to be reduced progressively to zero when the slider reaches the desired position. The various motor speeds during the movement of the slider to the new desired position are shown in FIG. 3, wherein the numeral 67 indicates the period of maximum motor 20 rotation, the numeral 68 the period during which the motor 20 operates at an intermediate speed, and the numeral 70 the period during which the rotation of the motor 20 is progressively reduced to zero.

Initially, before the motor 20 begins to rotate, as the slider 16 is physically positioned at a point corresponding to .4367 on a voltage wave from the scale 18 which has a null output signal when the slider is positioned at .4396, the energized windings 16A and 16B will cause a voltage to be induced in the winding 18A that has a relatively large magnitude as shown at point A in FIG. 2. When the motor 20 rotates and the slider 16 is moved in the forward direction toward the point .4396 the voltage output of the winding 18A progressively decreases to a negative value, passing through a null zero at the point .4396. The output voltage of the winding 18A is delivered via a means including a lead 72 and the amplifier 36 to the phase detector 38. The output of the phase detector 38 as gated by the source 29 is delivered to the limit detector 40 which previously received an output via means including a lead 74 from the travel counter 48. The limit detector 40 is programmed by the travel counter 48 to sense the voltage and phase of the voltage signal from the winding 18A and supply an output signal when the voltage passes through the null voltage and reaches a predetermined negative value as indicated as a (—) limit in FIG. 3. The output signal from the limit detector 40 also is programmed by the travel counter 48 to count the cycle counter 50 up and the travel counter 48 down when a 0 thru 4 count is initially present in the tens decade of the travel counter 48. When a 5 thru 9 count is initially present in the tens decade of the travel counter 48, the ouput signal from the limit detector 40 will cause the cycle counter 50 to count down and the travel counter 48 to count up. Additionally, when a count of 0 thru 4 is present in the tens decade of the travel counter 48, the converter 45 will cause the motor 20 to operate in a forward direction as described. When a count of 5 thru 9 is present in the tens decade of the travel counter 48 the converter 45 will cause the motor 20 to operate in a reverse direction. Thus upon the occurrence of an output signal from the limit detector 40 the travel counter 48 will be counted down and the cycle counter 50 counted up, causing a new count of 496 to appear in the cycle counter 50 which will cause the transformers 24, 26 and 28 and the switches 30, 32 and 34 to supply voltage signals to the windings 16A and 16B which will require the slider 16 to be moved to a new position of .4496 before a null voltage is again established. When the slider 16 moves through the new position of .4496, the windings 18A again supply a suitable signal through the amplifier 36 to the limit detector 40 which responds and provides a signal to the travel counter 48 and the cycle counter 50 which will again cause the travel counter 48 to count down an additional count and the cycle counter 50 to count up. The new count in the cycle counter 50 will again sequence the switches 30, 32 and 34 so the transformers 24, 26 and 28 will energize the windings 16A and 16B which will require the slider 16 to move to .4596 before a null signal is established. Thus as shown in FIG. 3, a series of nulls are progressively established which are changed as the slider 16 moves toward its final position. When the slider has moved 770 counts of the travel counter 48 a count of 3 will be present in the .01 column of the cycle counter 50.

However, when the travel counter 48 is counted down the additional required two counts, the cycle count in the .01 column of the cycle counter 50 will register 5, which corresponds to the final position of .1596. As shown in FIG. 2, during movement to the final position of .1596, the rotation of the motor 20 will progressively decrease, as shown by the portion 70 of the curve in FIG. 3. When the slider 16 moves toward the final selected position of .1596 the signal from the converter 45 via lead 62 ceases to control the electronic switch 42 as the electronic switch 42 is programmed by the travel counter 48 through a lead 78 to a controlling signal from the limit detector 40 via means including a lead 76 and causes the servodrive control 22 to respond to the analog signal supplied by the wave .1596 to position the nut 12 to a point corresponding to the position .1596. It is to be appreciated that should the motor 20 drive the nut 12 beyond the location .1596 then the analog output voltage wave from the winding 18A will reverse and the detector 40 will cause the electronic switch 42 to supply a signal which will require the direction of the motor 20 to be reversed to assure proper positioning of the slider 16 in the final desired position.

As described, the transducer 14 in the system is energized with voltages proportional to the sine and cosine of a given angle on a sine wave and for any particular set of applied voltages a null signal at a particular point in a segment on the scale 18 is established. However, because of the cyclic nature of the transducer 14, a similar null signal will be found at each tenth inch point position along the length of the scale 18 which null point can be moved within the tenth inch segment by changing the voltages applied to the transducer 14. As previously shown, the transducer 14 can be made to function as a linear movement quantizer if the voltages applied are successively switched as each null point is detected and a new null point is created which is subsequently detected as the transducer slider 16 is driven toward the newly desired position. Thus in the system it is imperative that each null point be detected so as to not lose a count in travelling to a new position. The operative speed of the system is therefore controlled by a means, not shown, such as a tachometer, which will limit the maximum speed of movement of the slider 16 relative to the scale 18 to a value which will assure the detection of each null point and the proper switching of the travel counter 48, the cycle counter 50 as well as the switches 30, 32 and 34 which control the voltages which are supplied to the windings 16A and 16B from the transformers 24, 26 and 28. Additionally in the system, the values of the plus and minus limit voltages as shown in curves in FIGS. 2 and 3 are selected to have a value less than the voltage corresponding to .18° on the sine shaped output voltage wave from the winding 18A. The value of .18° corresponds to a distance of .00005 inch on the scale 18. Further, as previously described, if the slider is to be moved to a new position that has a lesser value than the old position, the count which is registered in the tens column of the travel counter will equal a value of 5 thru 9 and the controlled system will operate as precedingly described to move the slider to the new position as the cycle counter is counted down and the travel counter is counted upwardly. The system as described operates digitally to the preselected .0100 position whereat the analog signal from the winding 18A is used to control the speed of the motor 20 as the slider is moved to the finally selected position. If desired, as shown by the curves in FIG. 4, the system may also be programmed to operate in a manner wherein the count in the cycle counter is used to control the speed of the motor 20 until the final .0001 segment is reached and whereat the cycle counter operates to cause the windings 16A and 16B to be energized to require the voltage wave from the winding 18A to have a null when the slider 16 is in the final position and to use the analog signal from the winding 18A during movement in the final .0001 segment to control the speed of the motor until the slider 16 is moved to the desired position.

While certain preferred embodiments of the invention has been specifically disclosed, it is understood that the invention is not limited thereto, as many variations will be readily apparent to those skilled in the art and the invention is to be given its broadest possible interpretation within the terms of the following claims.

What is claimed is:

1. A positioning control system comprising a pair of relatively movable members, drive means for moving the members relative to each other in response to an input signal, means for supplying an input signal to a first of said pair of members and means on a second of said pair of members energized by the input signal for providing an output voltage signal having a magnitude which varies cyclically as a sine function of distance moved when the members are moved between two predetermined spaced positions relative to each other, detector means having an input responsive to the output voltage signal for detecting a predetermined point on the sine wave of the output signal and for supplying an output signal when the members are in a predetermined position relative to each other, means including a counter having an input receiving the output signal from the detector means and having an output supplying an input to the means supplying the input signal to the first member for sequentially electrically shifting the sine wave output signal of the second member a predetermined distance in a predetermined direction relative to the first member to a new position and switching a counting state of the counter in response to the receipt of each successive output signal from the detecting means, and means responsive to an output signal from the counter means and the detector means for supplying the drive means with an input signal for de-energizing the drive means after the counter has switched to a selected state in response to a subsequent output signal from the detector means.

2. A position control apparatus comprising: a scale, a continuous winding formed as a series of identical loops on the scale, a slider, a pair of windings on the slider inductively coupled with the continuous winding for inducing a voltage in the continuous winding, said voltage having an amplitude which varies cyclically as a sine function of distance when the slider and scale are moved a predetermined unit distance relative to each other and providing a positioning signal in a region of the wave where the polarity of the alternating voltage reverses, means for energizing the windings of the slider selectively with input signals proportional to the sine and cosine values respectively of the sums of the angles corresponding to selected points on the voltage wave for electrically displacing the relative positions of the voltage wave and the scale and the position of the positioning signal for dividing the unit distance into a number of segments, drive means energizable for moving the slider and scale relative to each other in a selected direction in response to an input signal, switch means for sequencing the means energizing the windings of the slider for progressively displacing the voltage wave in response to an input signal, detector means having an input responsive to the alternating voltage and providing an output signal in response to each positioning signal, means including a switchable counter providing an input signal to the switch means for sequencing the switch means in response to each output signal for causing the voltage wave to be displaced one segment in said selected direction from the region which provided the output signal that sequenced the switch means and means responsive to the output signal for deenergizing the drive means after the counter has switched to a selected state.

3. The combination as recited in claim 1 wherein the means on the first member and the second member which provide an output signal includes a pair of windings on the first member and a continuous winding on the second member.

4. The combination as recited in claim 1 wherein the means for electrically shifting the sine wave causes the wave to be shifted a predetermined increment of the distance between the two spaced positions whereby the distance between the spaced positions is divided into a predetermined number of segments each of equal length.

5. The combination as recited in claim 3 wherein the detector means senses the magnitude of the output signal and provides an output signal in the region of the wave where the polarity of the voltage reverses.

6. The combination as recited in claim 5 wherein the total distance of relative movement between the members is a multiple of the distance between a segment as defined by the two spaced positions and during positioning from a previously selected position to a newly selected position the means including the counter and the detector means are arranged to initially supply an input to the means on the pair of members for shifting the wave so the predetermined point on the voltage wave in a selected segment corresponds to at least the value of the least significant digit of the newly selected position.

7. The combination as recited in claim 6 wherein the drive means is arranged to move the members toward the newly selected position and the counter means is arranged for sequentially shifting the voltage wave an increment toward the newly selected position in response to an output signal from the detector means.

8. The combination as recited in claim 7 wherein the counting means includes a position storage counter for registering the new position, a travel counter for registering the number of segments of relative movement required to move the members from the previously selected to the newly selected position and a cycle counter for controlling the number of increments the members must relatively move in at least one segment to be positioned at the newly selected position.

9. The combination as recited in claim 8 wherein the detector means provides an input signal to the cycle counter for changing a digital count in the cycle counter for each detected predetermined point on the voltage wave.

10. The combination as recited in claim 9 including a switch means for supplying a predetermined input to the pair of windings in response to the digital condition of the cycle counter.

References Cited

UNITED STATES PATENTS

| | | |
|---|---|---|
| 2,926,335 | 2/1960 | Bower. |
| 2,947,929 | 7/1960 | Bower. |
| 3,291,970 | 12/1966 | Evans et al. |

ORIS L. RADER, Primary Examiner

T. E. LYNCH, Assistant Examiner

U.S. Cl. X.R.

318—28, 30